(12) United States Patent
Bayrle et al.

(10) Patent No.: US 8,018,562 B2
(45) Date of Patent: Sep. 13, 2011

(54) LCD DISPLAY ELEMENT AND LCD DISPLAY PANEL

(75) Inventors: Reiner Bayrle, Langenau (DE); Thomas Bitter, Bad Ditzenbach (DE); Otto Bader, Warthausen (DE); Arnold Simon, Neu Ulm (DE)

(73) Assignee: AEG Gesellschaft fuer moderne informationssysteme mbH, Ulm (DE)

( * ) Notice: Subject to any disclaimer, the term of this patent is extended or adjusted under 35 U.S.C. 154(b) by 871 days.

(21) Appl. No.: 12/072,321

(22) Filed: Feb. 25, 2008

(65) Prior Publication Data
US 2008/0204389 A1 Aug. 28, 2008

(30) Foreign Application Priority Data
Feb. 26, 2007 (DE) .................... 20 2007 002 770 U

(51) Int. Cl.
*G02F 1/1343* (2006.01)
*G09G 3/36* (2006.01)

(52) U.S. Cl. .......... 349/139; 349/56; 349/123; 349/155; 349/143; 345/87

(58) Field of Classification Search ............. 349/56, 349/58, 41, 42, 82, 139, 143, 145, 149, 155, 349/123; 345/87
See application file for complete search history.

(56) References Cited

U.S. PATENT DOCUMENTS

| | | | | |
|---|---|---|---|---|
| 5,313,293 A | | 5/1994 | Hirakata et al. | 359/54 |
| 6,327,443 B1 * | | 12/2001 | Sekiguchi | 399/42 |
| 6,388,720 B1 * | | 5/2002 | Sekiguchi | 349/40 |
| 6,628,258 B1 * | | 9/2003 | Nakamura | 345/98 |
| 7,391,484 B2 * | | 6/2008 | Kaneko et al. | 349/44 |
| 2001/0022640 A1 | | 9/2001 | Nakahara | 349/123 |
| 2002/0026734 A1 | | 3/2002 | Bayrle et al. | 40/448 |
| 2002/0109658 A1 * | | 8/2002 | Noguchi | 345/92 |
| 2002/0163614 A1 | | 11/2002 | Hinata et al. | 349/139 |
| 2003/0095224 A1 | | 5/2003 | Asakura et al. | 349/143 |
| 2006/0108913 A1 * | | 5/2006 | Cok | 313/500 |
| 2008/0204389 A1 * | | 8/2008 | Bayrle et al. | 345/87 |

FOREIGN PATENT DOCUMENTS
DE 2058104 C3 11/1970
DE 4310112 A1 3/1993

OTHER PUBLICATIONS

Search report dated Sep. 21, 2007 from German Patent Office in related application DE 20 2007 002 770.2 (4 pages).
Search report dated May 6, 2008 of the European Patent Office in realted application EU 08151451.5 (5 pages).

* cited by examiner

*Primary Examiner* — Brian Healy
(74) *Attorney, Agent, or Firm* — Imperium Patent Works; Darien K. Wallace

(57) ABSTRACT

An LCD display element is provided that achieves a uniform LCD display panel by arranging individual LCD display elements side-by-side. The margin areas outside of the viewing field in the vicinity of the left and the right lateral edges of the LCD display element are configured to be equally narrow. The narrow width of the margin areas is achievable because row leads do not contact the row electrodes at one of their ends, but rather are routed in the spacing areas between individual column electrodes. Moreover, the electrical contact points are located in the spacing areas. In this manner, the wide lateral margin in the area of the contact points of the row electrodes, as in conventional LCD display elements, is avoided. Because the row leads are routed on the interior of the first cover plate, no contact strip is necessary in the area of penetration through the adhesive rim.

23 Claims, 12 Drawing Sheets

A-A

B-B

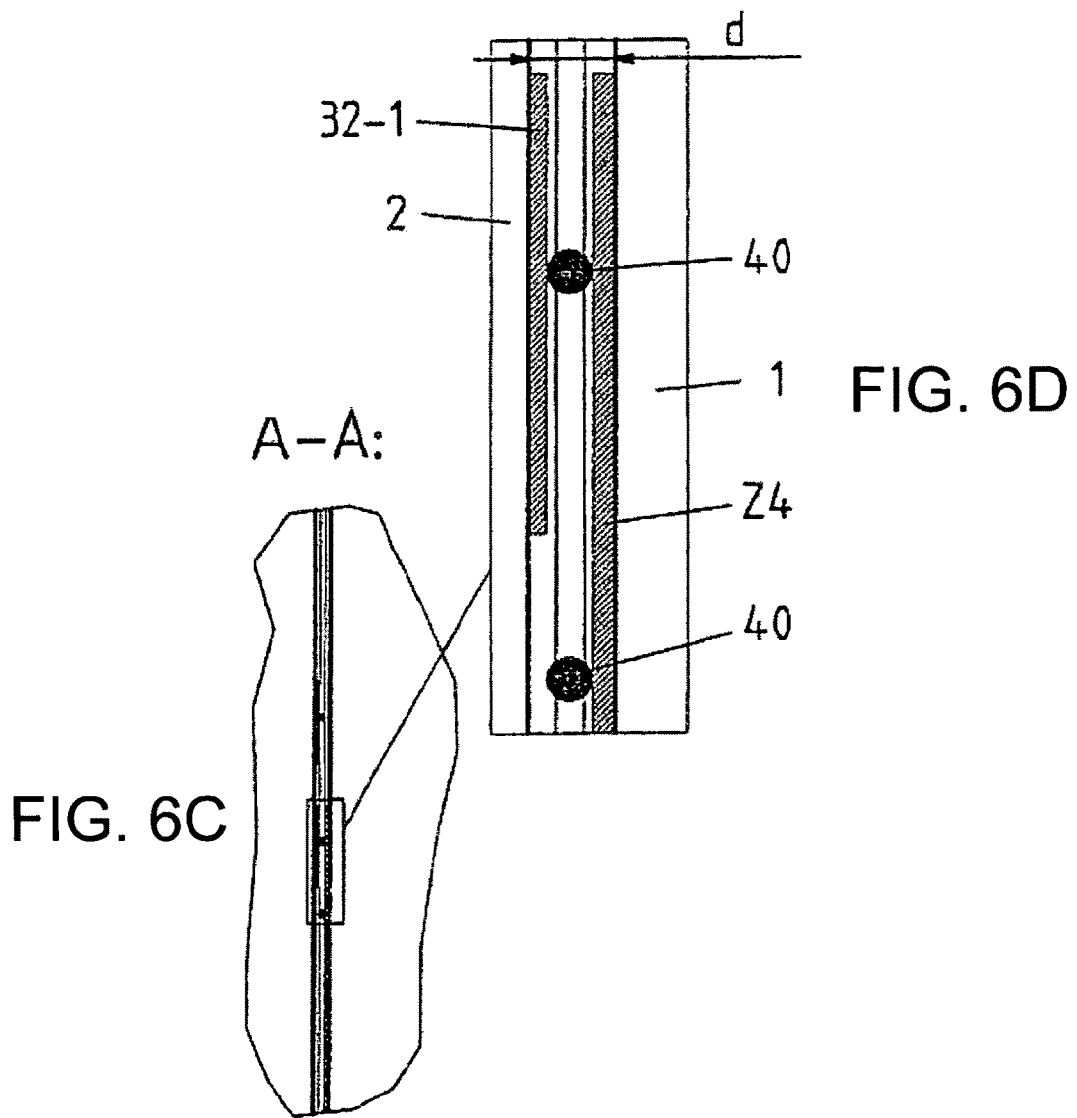

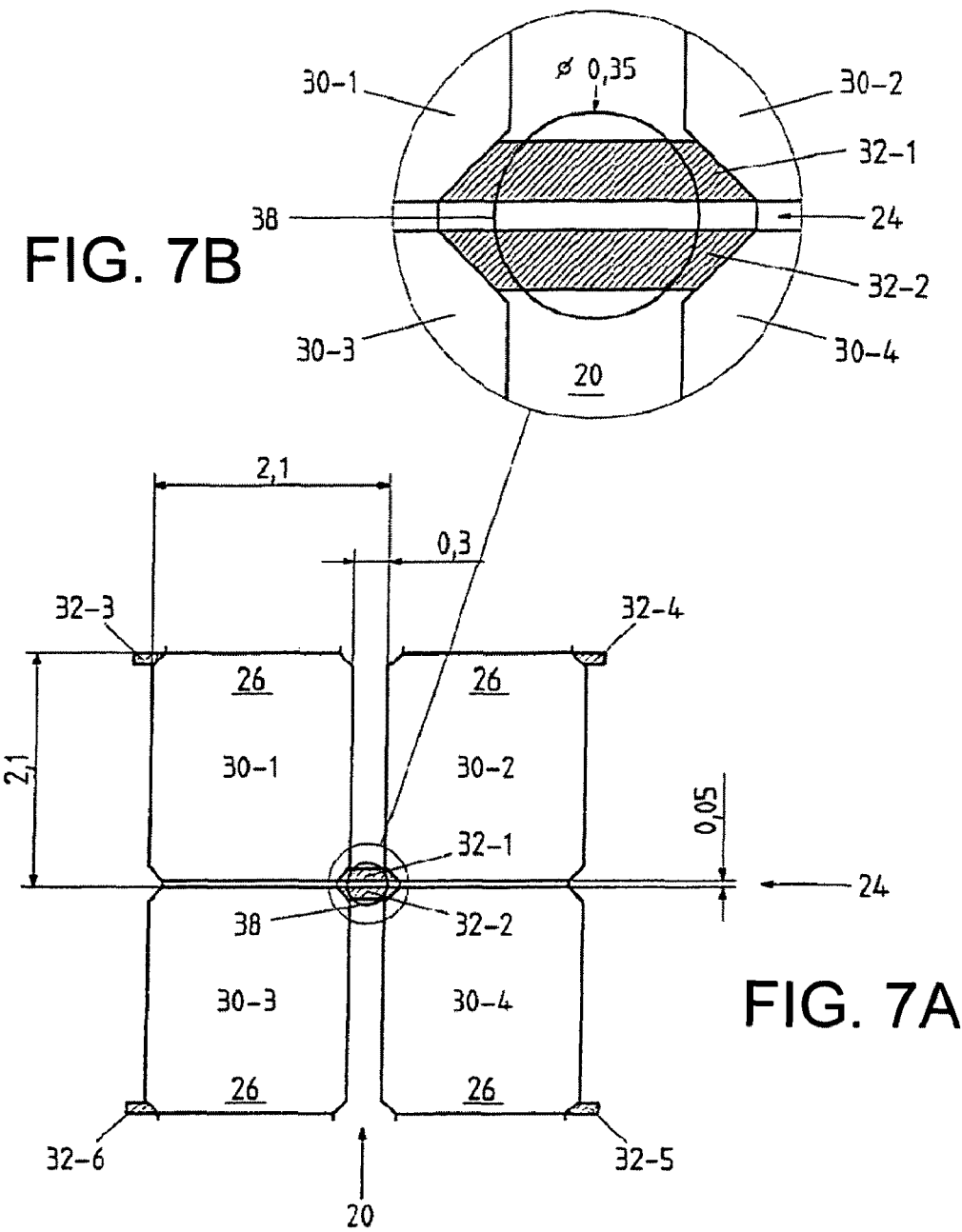

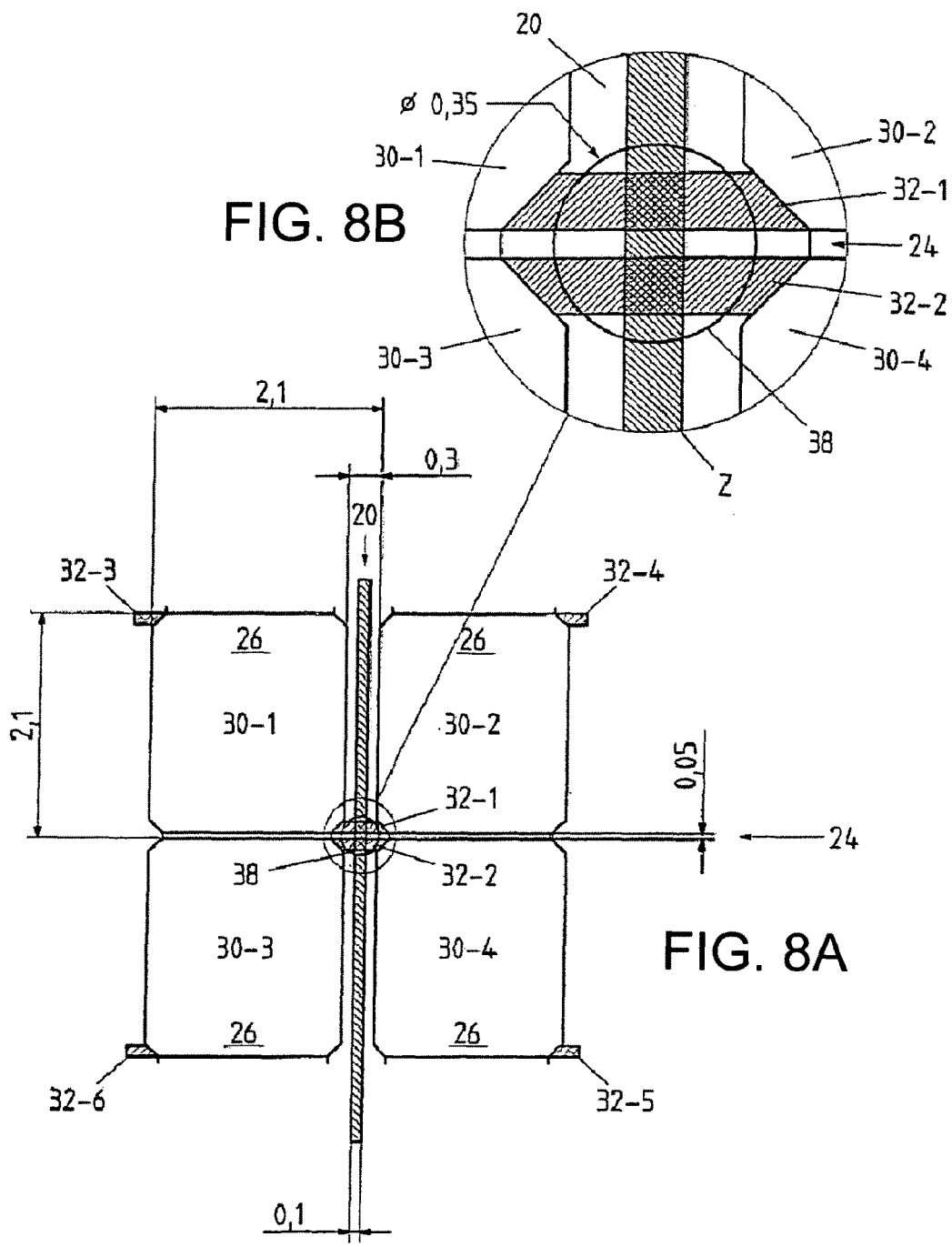

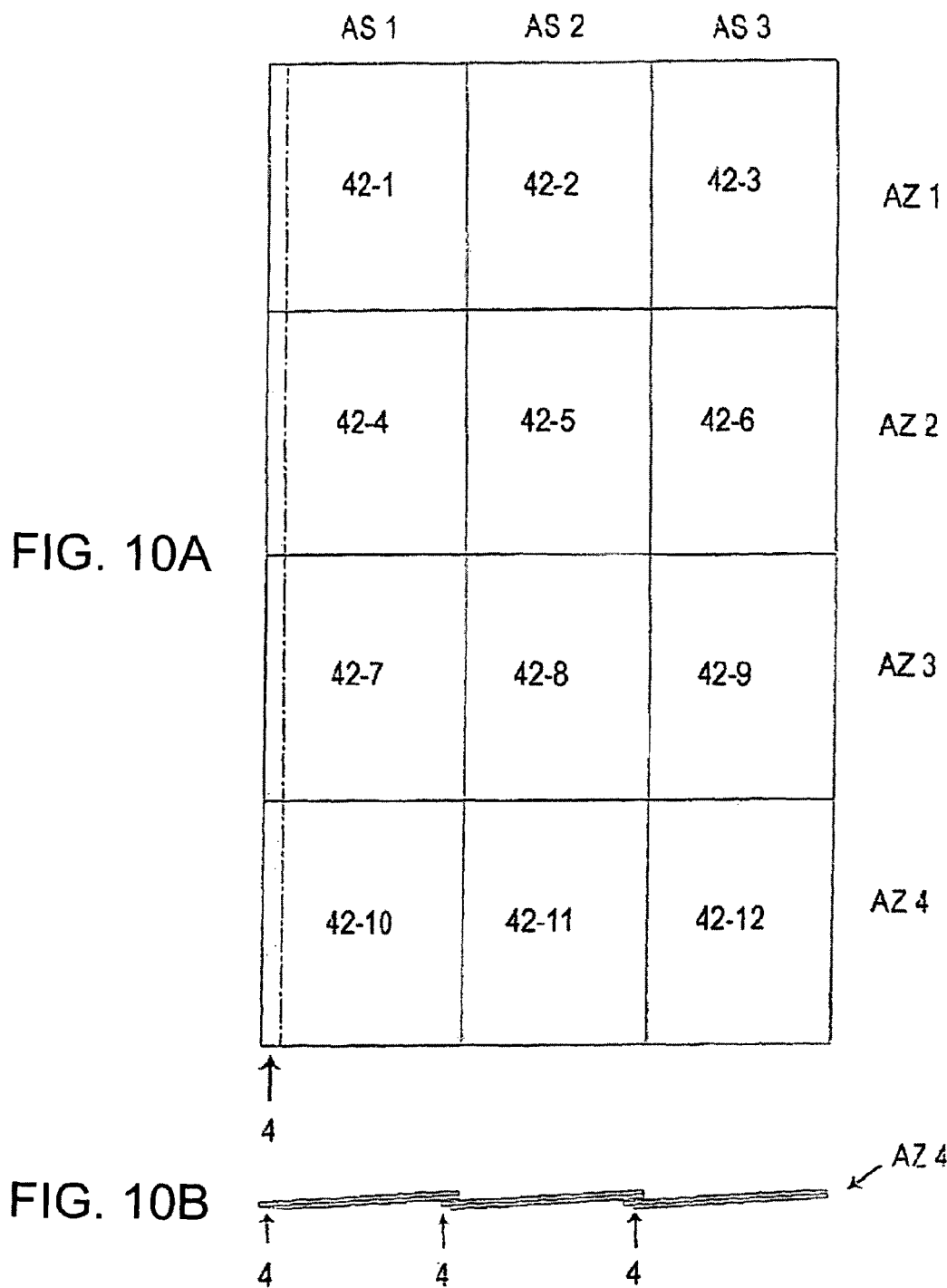

LCD DISPLAY ELEMENT AND LCD DISPLAY PANEL

CROSS REFERENCE TO RELATED APPLICATION

This application is based on and hereby claims the benefit under 35 U.S.C. §119 from German Patent Application No. DE 202007002770.2, filed on Feb. 26, 2007, in the German Patent Office, the contents of which are incorporated herein by reference. This application is a continuation of German Patent Application No. DE 202007002770.2.

TECHNICAL FIELD

The present invention relates generally to LCD display elements, and more specifically to an LCD display panel with a plurality of novel LCD display elements.

BACKGROUND

LCD display elements typically include a liquid crystal that is encased by means of an adhesive rim between two optically translucent cover plates. An electrode assembly in matrix form, with row and column electrodes, usually in strip form, is positioned between the two cover plates. The strip-type row electrodes are separated from one another by separation areas, and the strip-type column electrodes are separated from one another by spacing areas. The areas in which the row and column electrodes cross over one another, with the liquid crystal between them, define the individual pixels of an LCD display element.

FIGS. 11 and 12 schematically illustrate two prior art variants of this type of pixel matrix configuration. FIG. 11 shows one matrix LCD display element similar to the one disclosed in U.S. Pat. No. 5,313,293 to Hirikata et al. The LCD display element 100 is rectangular and has a left lateral edge 101, a right lateral edge 102, an upper lateral edge 103 and a lower lateral edge 104. The reference numeral 106 designates the adhesive rim, which attaches the two optically translucent cover plates to one another, thereby enclosing the liquid crystal. A matrix-type electrode assembly 108 is provided within the boundaries of the adhesive rim 106. Matrix-type electrode assembly 108 has five strip-type, rectangular row electrodes ZE1 through ZE5, which are arranged in parallel, one on top of another. Between each of the individual row electrodes ZE1 through ZE5, a strip-type separation area 110 is provided that electrically insulates the row electrodes ZE from one another. The electrodes are positioned within a single plane on the interior side of one of the two cover plates.

Perpendicular to the row electrodes ZE1 through ZE5 are five strip-type, rectangular column electrodes SE1 through SE5. The column electrodes are arranged on the interior side of the other of the two cover plates, within a single plane. Strip-type spacing areas 112 are provided between each of the column electrodes SE. The spacing areas 112 electrically insulate the column electrodes SE from one another. The areas in which the row and column electrodes ZE and SE cross over one another, with the liquid crystal between them, define the individual pixels 114 of the LCD display element. The area of these pixels 114 designates a viewing field 116, in which information can be optically displayed. The row and column electrodes ZE and SE are activated via row leads Z1 through Z5 and column leads S1 through S5, respectively. The row leads Z1 through Z5 and the column leads S1 through S5 contact the strip-type row electrodes ZE and column electrodes SE, respectively, at one of their ends. The row leads Z1 through Z5 contact the row electrodes ZE1 through ZE5 at their ends, which lie in the vicinity of the left lateral edge 101. The column leads S1 through S5 contact the column electrodes SE1 through SE5 in the vicinity of the lower lateral edge 104. The column leads S1 through S5 are fed through the adhesive rim 106 in the vicinity of the lower lateral edge 104.

In a variant of the matrix LCD display element shown in FIG. 11, the row leads Z1 through Z5 are guided downward, within the boundaries of the adhesive rim, toward the lower lateral edge 104 to a contact strip 118. In the vicinity of the contact strip 118, the row leads Z are guided from the interior side of the upper cover plate to the interior side of the lower cover plate, where they also extend through the adhesive rim 106. FIG. 12 shows a variant of a matrix LCD display element in which the row leads are guided through the adhesive rim 106 in the vicinity of the left lateral edge 101 and remain on the interior side of the upper cover plate. United States Patent Application Publication 2001/0022640 to Nakahara discloses a process that uses electrically conductive particles in the adhesive rim to produce an electrically conductive connection between the electrodes on the interior sides of the upper and lower cover plates.

As a result of the configuration of the leads in both of these prior art LCD display elements, a comparatively wide, optically unusable margin is created in the area of the left and lower lateral edges 101, 104. When a plurality of such LCD display elements are arranged side by side, the LCD elements can be arranged flush against one another only along their lateral edges on which no row or column leads extend through the adhesive rim 106. In other words, with the conventional LCD display element shown in FIG. 12., only four LCD elements can be arranged side-by-side, one on top of another without disruptive margins. In the variant of the matrix LCD display element shown in FIG. 11, in the case of a linear, side-by-side, flush arrangement, the widened area between the left lateral edge 101 and the viewing field 116 also results in clearly visible margins, creating a non-uniform display or viewing field.

The variant of the matrix LCD display element shown in FIG. 11 also results in clearly visible margins. The linear, side-by-side, flush arrangement shown in FIG. 11 results in clearly visible margins in the widened area between the left lateral edge 101 and the viewing field 116 and creates a non-uniform display or viewing field.

In order to eliminate the clearly visible margins and other disadvantages of the prior art configurations, an LCD display element is sought that can be assembled to create a uniform LCD display panel with a side-by-side arrangement of individual LCD display elements. A corresponding LCD display panel is also sought.

SUMMARY

The margin areas outside of the viewing field in the vicinity of the left and the right lateral edges of an LCD display element are configured to be of equally narrow width. The narrow width of the margin areas is achievable because row leads do not contact the row electrodes at one of their ends, but are instead routed in the spacing areas between the individual column electrodes. Moreover, the electrical contact points are located in the spacing areas. In this manner, the wide lateral margin in the area of the contact points of the row electrodes as in the prior art is avoided. Because the row leads are routed on the interior side of the first cover plate, no contact strip as used in the prior art configuration of FIG. 11 is necessary in the area of penetration through the adhesive rim. Because the connecting elements are narrower than the pixel segments, the row leads that extend in the spacing areas between the column electrodes are prevented from creating optically perceptible activations in the areas in which the row leads cross over the non-contacted row electrodes.

If a number z of row electrodes is smaller than a number s of column electrodes, at most one row lead is routed between two column electrodes. If the number z of row electrodes is greater than or equal to the number s of column electrodes, then at least one row lead is routed between all column electrodes. In either case, the spacing areas are as narrow in configuration as possible.

Both the row leads and the column leads are guided through the adhesive rim to the exterior along a shared, straight LCD edge or lateral edge. In this manner, the LCD elements can be arranged side-by-side along the remaining lateral edges to form an LCD panel display.

The connecting elements electrically connect the pixel segments to one another alternately at their upper and lower edges. In this manner, the number of adhesive points is reduced. Depending upon the application, various forms can be selected for the strip-type electrodes and for the individual pixels that are created from them. Rounded forms or chamfered corners are particularly preferred because these allow more space for the electrical contact points and the adhesive points.

A liquid crystal cell or an LCD display element having constant spacing between the two cover plates is created. The constant spacing is achieved by connecting the two cover plates to one another not only in the area of the adhesive rim, but also in the area of the adhesive points. The adhesive points are large enough in configuration that each row electrode is also covered by the adhesive point in the spacing area. In this manner, a potential activation of the row electrode in this area by the intersecting row lead is rendered imperceptible. A uniform optical appearance is created.

The adhesive rim and the adhesive points can be applied to one of the cover plates in a single processing step. The adhesive points and/or the electrical contact points can also run together with the adhesive rim. Production of the electrical contact points is thereby simplified.

An electrical conductor is prepared in a simple manner to be electrically conductive in only one direction, namely perpendicular to the first and second planes. The electrical conductor is not electrically conductive in a direction parallel to the first and second planes.

Having an electrical conductor that is electrically conductive in only one direction makes it possible for the electrical contact points to be comparatively large in configuration. A short circuit between two adjacent row electrodes is not possible due to the absence of electrical conductivity in the direction parallel to the first and second planes. Because the average diameter of the conductive particles is somewhat larger than the distance between the two cover plates, the conductive particles are clamped between the two cover plates. Clamping the conductive particles between the two cover plates results in good electrical contact with the row electrode and the row lead allocated to it. Thus, a single layer of conductive particles is created. Because the electrically conductive particles are arranged spaced apart from one another, the electrical contact points are not electrically conductive in a transverse direction (a direction parallel to the first and second planes). This desirable arrangement of the conductive particles is achieved through a concentration and statistical distribution of the conductive particles in the adhesive material of the electrical contact points or on the liquid crystal alignment layer in the area of the electrical contact points.

Satisfactory optical impressions for the LCD display elements are achieved when between 50% to 100% of the crossover areas between the spacing areas and separation areas are equipped with adhesive points.

LCD elements that are rectangular in configuration can be joined flush against one another on three sides, allowing the margin area with the adhesive rim to be minimal in configuration.

The rows and columns of the LCD display element can be transposed. The side on which the column leads contact the column electrodes can also be switched.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 6A-D are schematic diagrams of various views of an electrical contact point of an LCD display element.

FIGS. 7A-B are schematic diagrams of various views of an adhesive point of an LCD display element.

FIGS. 8A-B are schematic diagrams of various views of an adhesive point with a row lead that extends into a spacing area.

FIG. 10A-B are various views of a display panel including a plurality of LCD display elements that are arranged in the manner of shingles, side-by-side and partly overlapping one another.

DETAILED DESCRIPTION

Reference will now be made in detail to some embodiments of the invention, examples of which are illustrated in the accompanying drawings.

Figure 1:
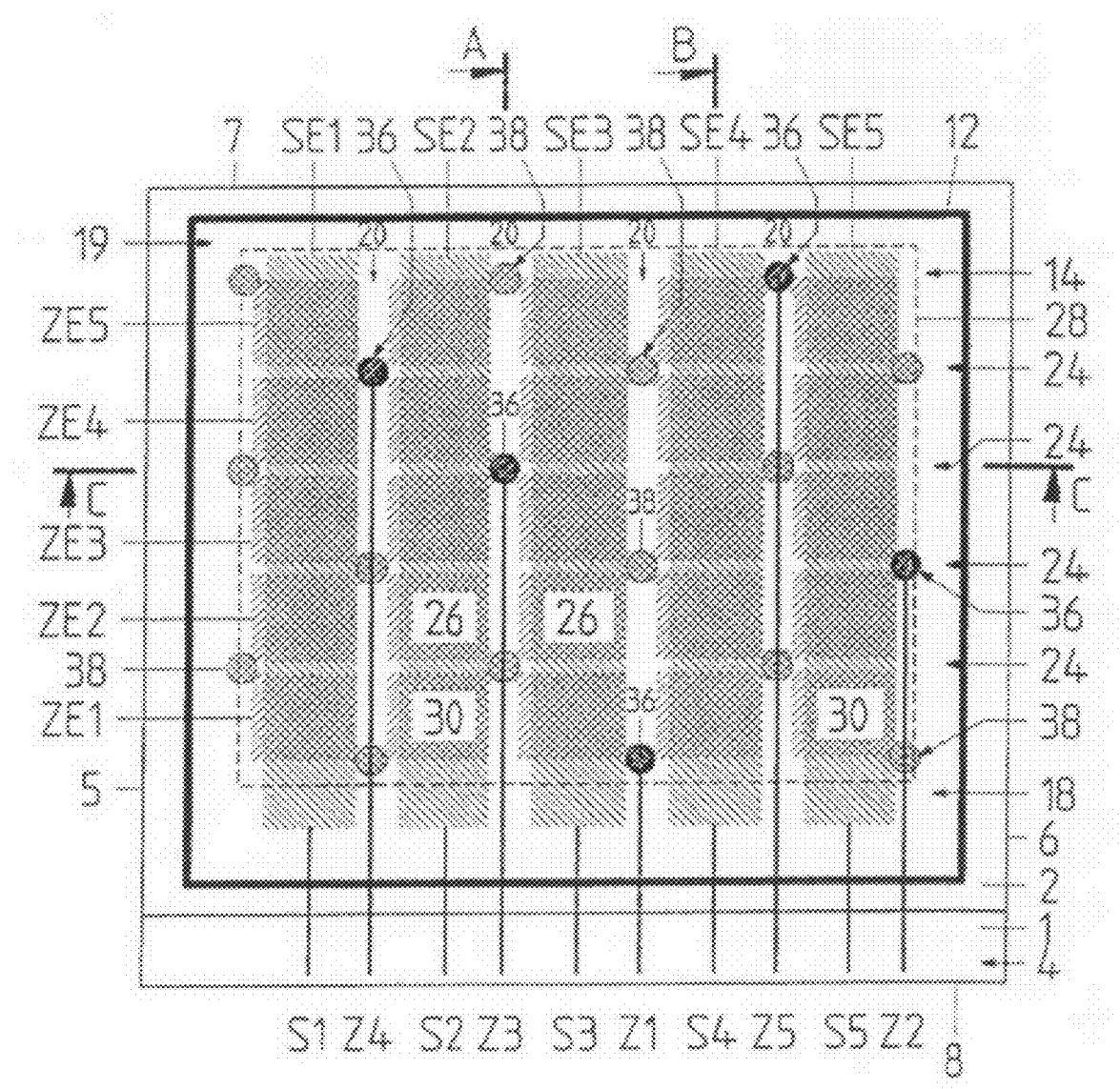
FIG. 1 is a diagram of an LCD display element according to an embodiment of the invention.

FIGS. 1 through 5 are schematic representations of various embodiments of LCD display elements. FIG. 1 shows a rectangular LCD display element with a first, optically transparent cover plate 1 and a second optically translucent cover plate 2. The two cover plates 1 and 2 are of equal width. The first cover plate 1 is somewhat longer than the second cover plate 2, creating a contact margin 4. The edges of the two cover plates 1 and 2 form a left lateral edge 5, a right lateral edge 6, an upper lateral edge 7 and a lower lateral edge 8. A liquid crystal 10 is located between the two cover plates 1 and 2. The optically transparent and translucent cover plates 1 and 2 are attached to one another, spaced somewhat apart from one another, by an adhesive rim 12. The liquid crystal 10 is enclosed by the two cover plates 1 and 2 and the adhesive rim 12. In one embodiment, liquid crystal 10 is a TN or an ETN liquid crystal and has a twisted liquid crystal structure.

A matrix-type electrode assembly 14 is provided within the boundaries of the adhesive rim 12. The matrix-type electrode assembly 14 has five strip-type row electrodes ZE1 through ZE5 and five strip-type, rectangular column electrodes SE1 through SE5. The column electrodes SE are arranged within a first plane 16 on the interior side of the first cover plate 1, and have a first electrode end 18 and a second electrode end 19. Spacing areas 20 are provided between the individual column electrodes SE. The spacing areas 20 electrically insulate the column electrodes SE from one another. The row electrodes ZE are arranged within a second plane 22 on the interior side of the second cover plate 2. The individual row electrodes ZE are electrically insulated from one another by separation areas 24. The areas in which the row and column electrodes ZE and SE cross over one another, with the liquid crystal 10 between them, define the individual pixels 26 of the LCD display element. The area of these pixels 26 defines a viewing area 28 in which information can be optically displayed.

Figure 2:
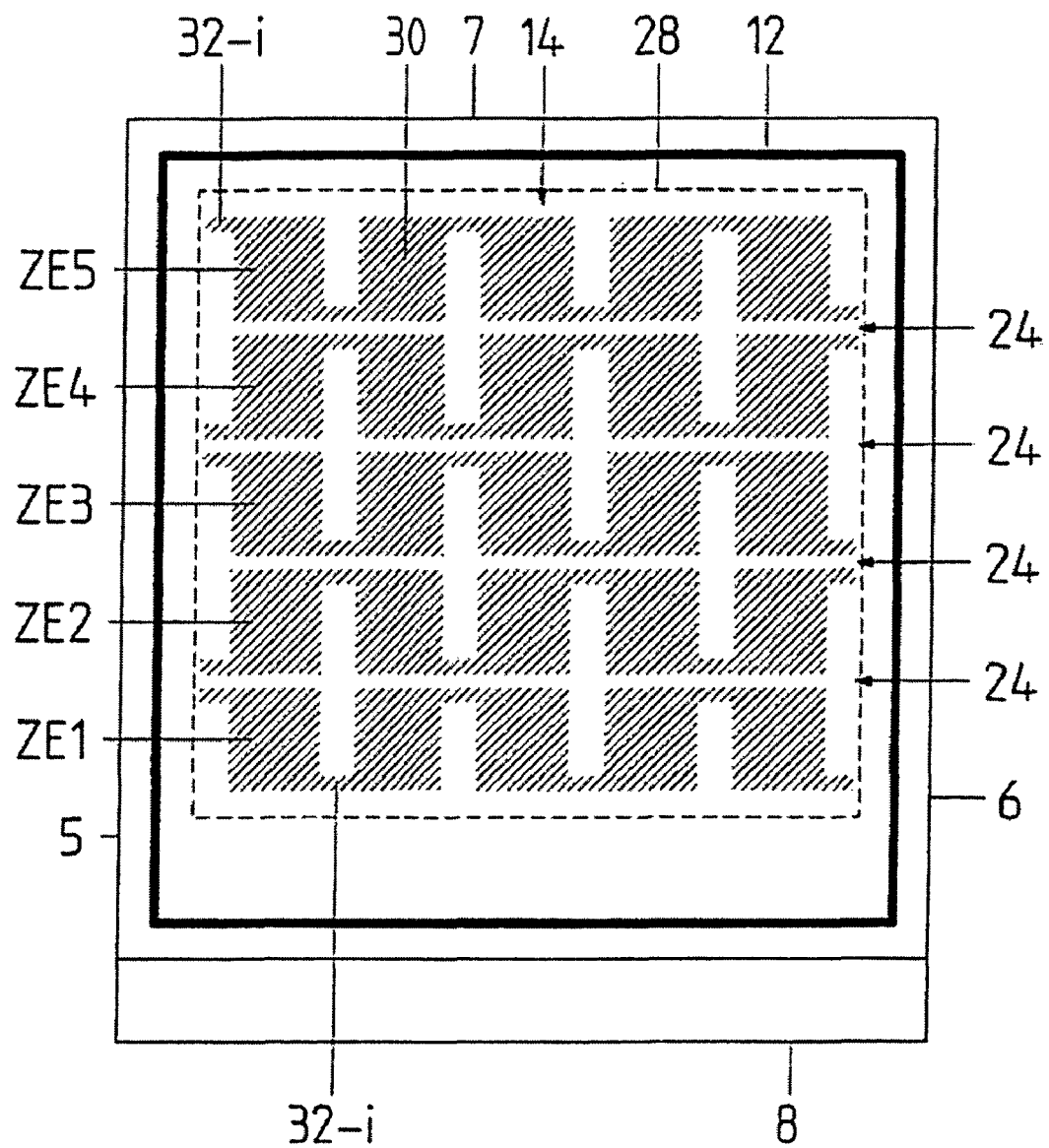
FIG. 2 is a diagram of the layout of the row electrodes of the embodiment of FIG. 1.

FIG. 2 shows that the individual row electrodes ZE are significantly narrower in the spacing area than in the crossover or pixel area. Essentially, the individual row electrodes ZE consist of a plurality of pixel segments 30 that determine the shape of the individual pixels 26. The pixel segments 30 are electrically connected to one another via connecting elements 32. The connecting elements 32 alternatingly connect the upper and the lower edges of the pixel segments 30. An LCD alignment layer 34 is also arranged on the interior side of the first or second cover plate. The LCD alignment layer 34 is arranged on top of the row electrodes ZE and column electrodes SE.

The row electrodes ZE and column electrodes SE are activated via row leads Z1 through Z5 or via column leads S1 through S5. Both the row leads Z1 through Z5 and the column leads S1 through S5 are arranged within the first plane 16 on the interior side of the first cover plate 1. The column leads SE contact each of the column electrodes SE at their first electrode end 18. The column leads S1 through S5 are routed out of the liquid crystal cell through the adhesive rim 12 to the contact margin 4 in the vicinity of the lower lateral edge 8. The row leads Z1 and Z3 through Z5 are routed between the column electrodes SE in the spacing areas 20. The row lead Z2 to the second row electrode ZE2 is routed in the area between the fifth column electrode SE5 and the adhesive rim 12 near the right lateral edge 6. Alternatively, the second row lead Z2 can also be routed under the adhesive rim 12.

Figure 3:
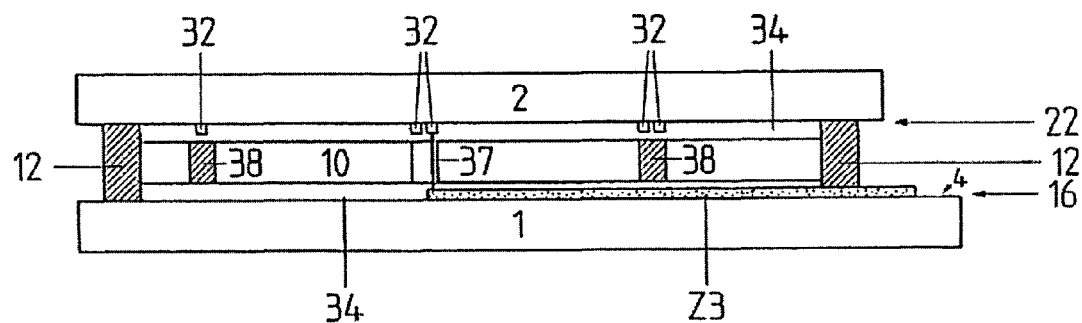
FIG. 3 is a cross sectional view of the embodiment of FIG. 1 along the A-A axis.
Figure 5:
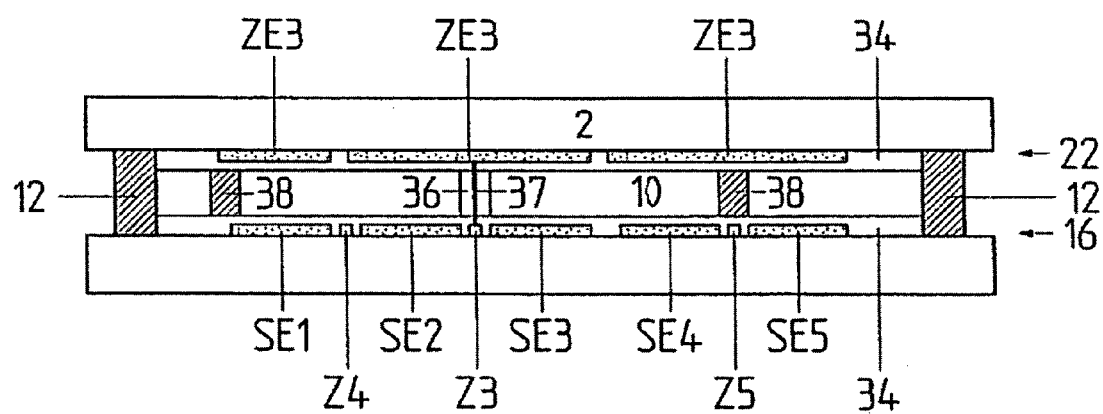
FIG. 5 is a cross sectional view of the embodiment of FIG. 1 along the C-C axis.

Each of the individual row leads Z1 through Z5 extends within the first plane 16, up to a point underneath the connecting element 32 of the row electrode ZE to be contacted. Each of the individual row leads Z1 through Z5 ends in an electrical contact point 36. The electrical contact point 36 displaces the liquid crystal 10 from the first plane 16 to the second plane 22. In the second plane 22, the electrical contact point 36 electrically connects each connecting element 32 of the corresponding row electrode ZE to be contacted to the allocated row lead, as shown in FIG. 3. The electrical contact points 36 are to be electrically conductive only in a perpendicular direction to the cover plates 1 and 2, as opposed to in a parallel direction to the cover plates. The electrical conductivity only in a perpendicular direction is indicated in FIGS. 3 and 5 by perpendicular lines 37. The manner in which the electrical conductivity is achieved in only one direction is later explained below in reference to FIG. 6D.

FIG. 1 shows that the first row lead Z1 for activating the first row electrode ZE1 is positioned between the third and fourth column electrodes SE3 and SE4. The third row lead Z3 for activating the third row electrode ZE3 is positioned in the area between the second and third column electrodes SE3 and SE5. The fourth row lead Z4 for activating the fourth row electrode ZE4 is positioned in the area between the first and second column electrodes SE1 and SE2. The fifth row lead Z5 for activating the fifth row electrode ZE5 is positioned in the area between the fourth and fifth column electrodes SE4 and SE5.

The LCD display element of FIG. 1 includes adhesive points 38 that are spaced evenly over the viewing field 28 at multiple areas in which separation areas 24 and spacing areas 20 cross over one another. The adhesive points 38 displace the liquid crystal 10 and connect the two cover plates 1 and 2 to one another in the manner of the adhesive rim 12. The adhesive points 38 are preferably arranged at crossover areas between the separation area and the spacing area in which a row lead in the first plane 16 crosses over a connecting element 32 of a row electrode in the second plane 22 that is not to be activated. In this spatial configuration, however, this small crossover area could potentially be activated with corresponding activation signals. The adhesive points 38 provided in these areas prevent this. As shown in FIG. 1, either an adhesive point 38 or an electrical contact point 36 is preferably positioned at each crossover area between the separation areas 24 and the spacing areas 20 in which connecting elements 32 are present. A liquid crystal cell with a constant distance between the two cover plates 1 and 2 is achieved with the adhesive points 38, which are evenly distributed over the viewing field 28 or the LCD display element. The liquid crystal cell therefore has a liquid crystal 10 of constant thickness.

Figure 4:
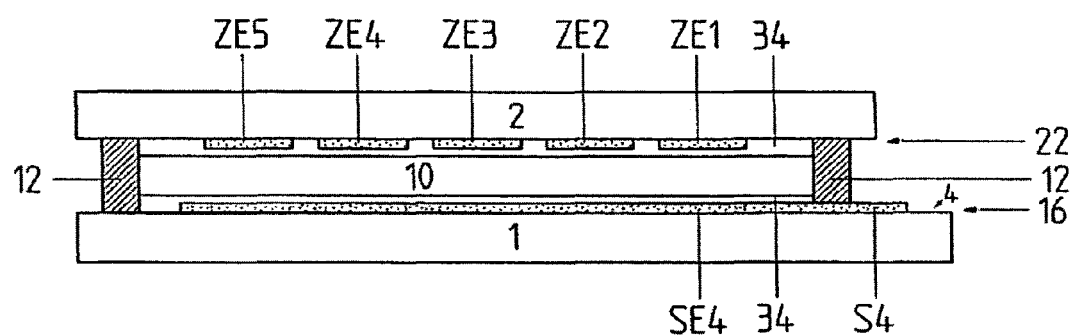
FIG. 4 is a cross sectional view of the embodiment of FIG. 1 along the B-B axis.

FIG. 3 shows a cross sectional view through the center of the spacing area 20 between the second and third column electrodes SE2 and SE3 along the line A-A in FIG. 1. FIG. 4 shows a cross sectional view along the center of the fourth column electrode SE4 and the allocated fourth row lead Z4 along the line B-B. FIG. 5 shows a cross sectional view along the upper edge of the third row electrode ZE3 along the line C-C.

The illustration of the exemplary embodiment of the invention in FIGS. 1 through 5 is merely schematic representation and is not true to scale. FIGS. 6 through 8 are drawn more closely to scale and show four exemplary, directly adjacent pixels 26. The pixels 26 (designated as pixel segments 30-$i$) have a rectangular basic shape with beveled or chamfered corners. The chamfered corners serve to enlarge the crossover areas between the spacing areas 20 and the separation areas 24. This creates more space for the electrical contact points 36 and the adhesive points 38. The separation areas 24 are approximately 0.05 mm wide and therefore are much thinner than the approximately 0.3 mm thick spacing areas 20 in which the row leads Z are routed. The row leads Z are approximately 0.1 mm wide. The connecting elements 32-$i$ are also approximately 0.1 mm wide. The diameter of the adhesive points 38 and the electrical contact points 36 is approximately 0.35 mm. The individual pixels 26 have a width of approximately 1.8 mm and a height of approximately 2.1 mm.

Figure 6B:
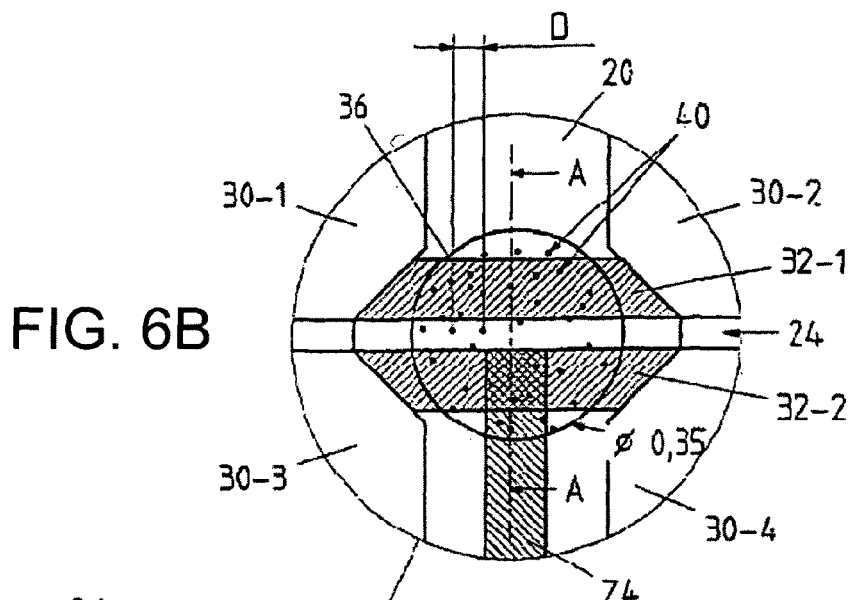
Figure 6A:
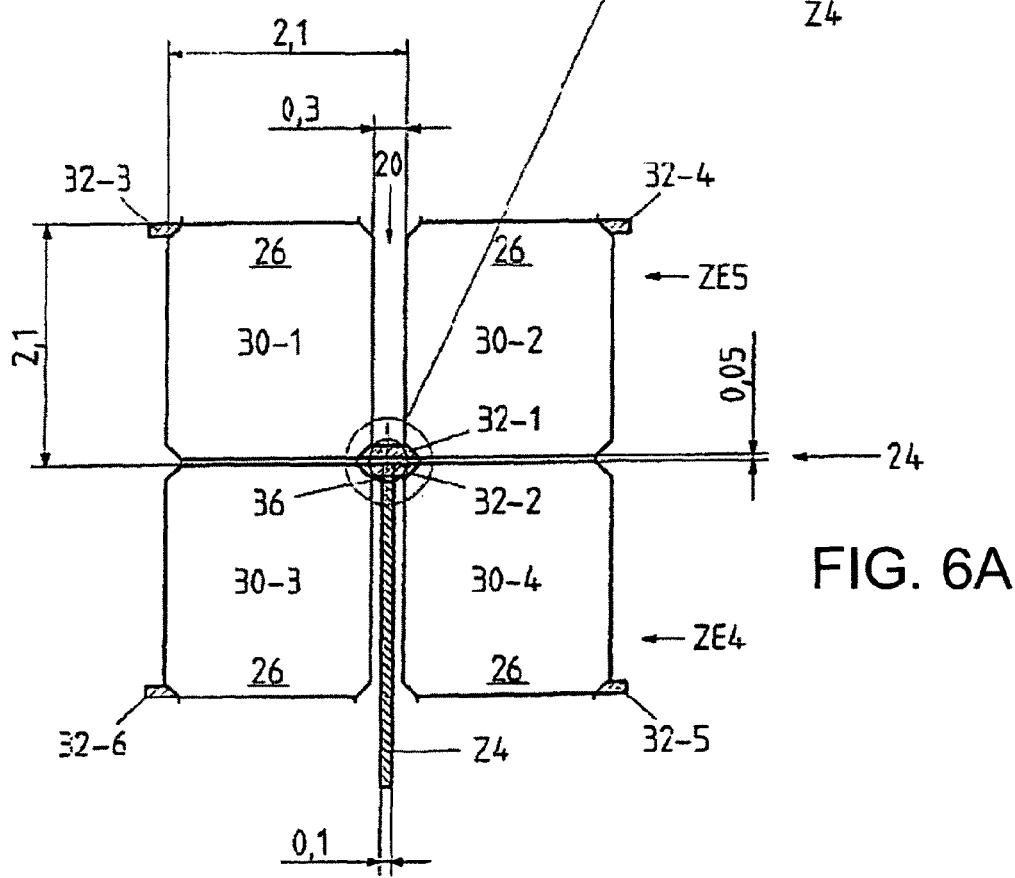

FIG. 6A shows an electrical contact point 36 located between four pixels 26 (designated as pixel segments 30-1 through 30-4) in the area in which a spacing area 20 and a separation area 24 cross over one another. FIG. 6B is an enlarged view of the electrical contact point 36 of FIG. 6A. FIG. 6C shows a cross section along the line A-A of FIG. 6B.

FIG. 6D shows an enlarged section of FIG. 6C. The area shown in FIGS. 6A-D corresponds to the electrical contact point 36 in FIG. 1, which connects the fourth row lead Z4 to the fourth row electrode ZE4. The pixel segments 30-1 and 30-2 are a part of the fifth row electrode ZE5 and are connected to one another via a connecting element 32-1. The pixel segments 30-3 and 30-4 are connected to one another via a connecting element 32-2. The pixel segments 30-3 and 30-4 are a part of the fourth row electrode ZE4, which is to be contacted. Consistent with the configuration of connecting elements 32-*i* shown in FIG. 2, the connecting elements 32-3, 32-4, 32-5 and 32-6 in FIG. 6A are inserted diagonally opposite the connecting elements 32-1 and 32-2.

As was already discussed in the description of FIGS. 1 through 5, the electrical contact points 36 are electrically conductive only in a direction perpendicular to the electrode assembly 14. This is achieved through an arrangement and configuration of electrically conductive particles 40 in the electrical contact points 36. The spacing "d" shown in FIG. 6D between the interior sides of the two cover plates 1 and 2 is approximately 5 to 10 μm. The diameter of an electrical contact point 36, from a plan perspective, is approximately 0.35 mm as shown in FIG. 6B. The conductive particles 40, e.g., in the form of tiny gold spheres, have an average diameter that is somewhat larger than the cell gap "d". Thus, the average diameter of the conductive particles 40 is between 10% and 20% larger than the spacing "d" between the two cover plates 1 and 2. Therefore, the conductive particles 40 are clamped and compressed between the two cover plates 1 and 2 so that a good electrical contact to the fourth row electrode ZE4 and the fourth row lead Z4 is created. FIG. 6B shows that the single layer of electrically conductive particles 40 is statistically distributed over the cross-sectional surface of the electrical contact points in such a way that an average distance "D" results between the individual particles 40, which is substantially larger than their diameter. Thus the electrical contact points 36 are not electrically conductive in a direction parallel to the cover plates 1 and 2 (a "transverse" direction) or parallel to the first and second planes 16 and 22. The fourth row lead Z4 ends precisely beneath the connecting element 32-2 so that the tiny gold spheres 40 distributed over the entire cross-sectional surface of the electrical contact point 36 produce an electrical contact only between the connecting element 32-2 and the end of the fourth row lead Z4 located directly beneath it.

FIGS. 7A and 7B show an adhesive point 38 between four pixels 26 (designated as pixel segments 30-1 through 30-4) in a manner similar to the diagrams in FIGS. 6A through 6D. FIGS. 7A and 7B correspond to the illustration of the adhesive point 38 in FIG. 1 between the third and fourth column electrodes SE3 and SE4 and the fourth and fifth row electrodes ZE4 and ZE5 or the third and fourth row electrodes ZE3 and ZE4.

FIGS. 8A and 8B show an adhesive point 38 beneath which a row lead Z extends. For example, this corresponds to the adhesive points 38 in FIG. 1 between the first and second column electrodes SE1 and SE2 and the second and third row electrodes ZE2 and ZE3. Alternatively, this corresponds to the adhesive points 38 in FIG. 1 between the fourth and fifth column electrodes SE4 and SE5 and the third and fourth row electrodes ZE3 and ZE4. FIGS. 6 through 8 also indicate exemplary dimensions for the individual pixels 26, the row leads Z, the spacing areas 20 and the separation areas 24. It is also apparent that the pixels 26 or the pixel segments 30-*i* have a rectangular basic shape, with chamfered corners. The separation areas 24 can be thinner and narrower in configuration than the spacing areas 20 because no leads are routed in the separation areas 24 between the individual row electrodes ZE. The width of the connecting elements 32 is within the range of the width of the row leads Z.

Figures 9A, 9B:
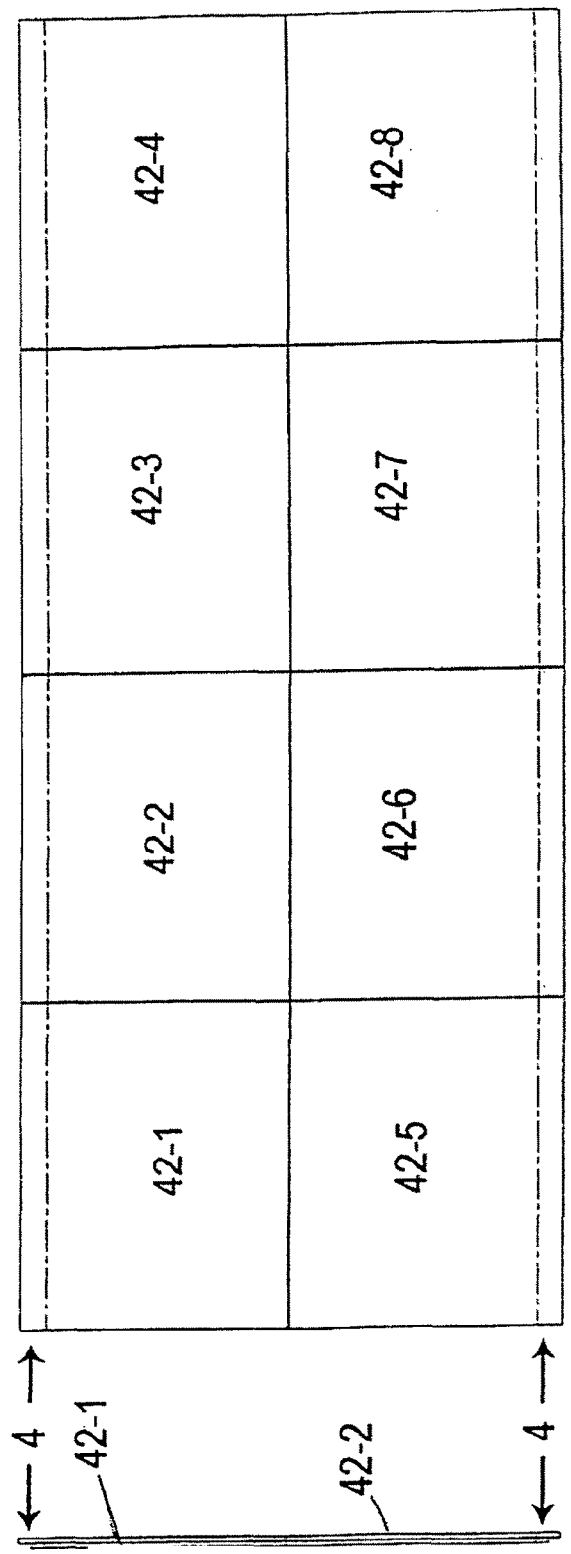
FIGS. 9A-B are various views of a display panel including a plurality of LCD display elements that are arranged flush against one another, side-by-side and one above the other.
Figure 11:
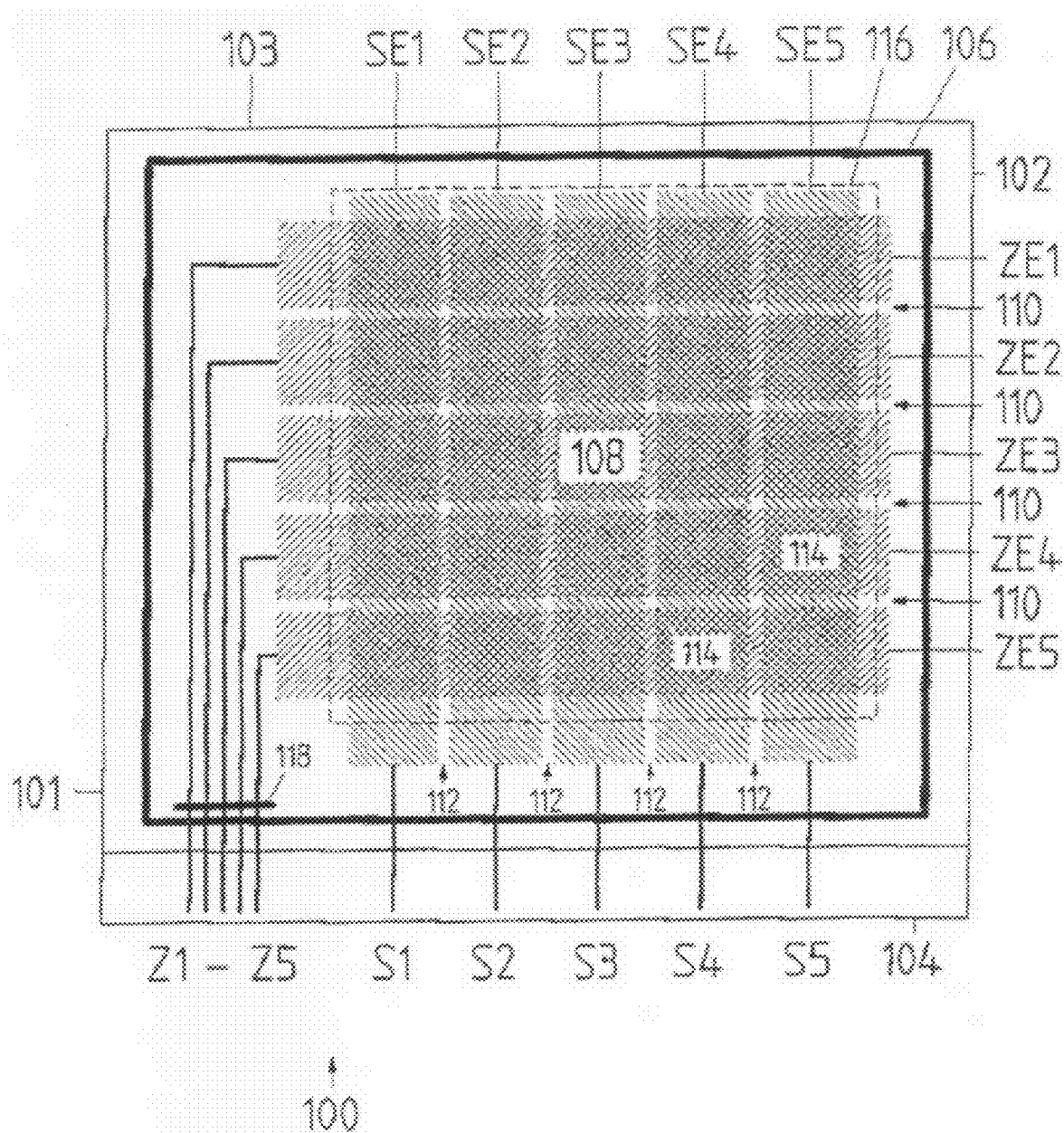
FIG. 11 is a schematic diagram of an LCD display element according to the prior art.
Figure 12:
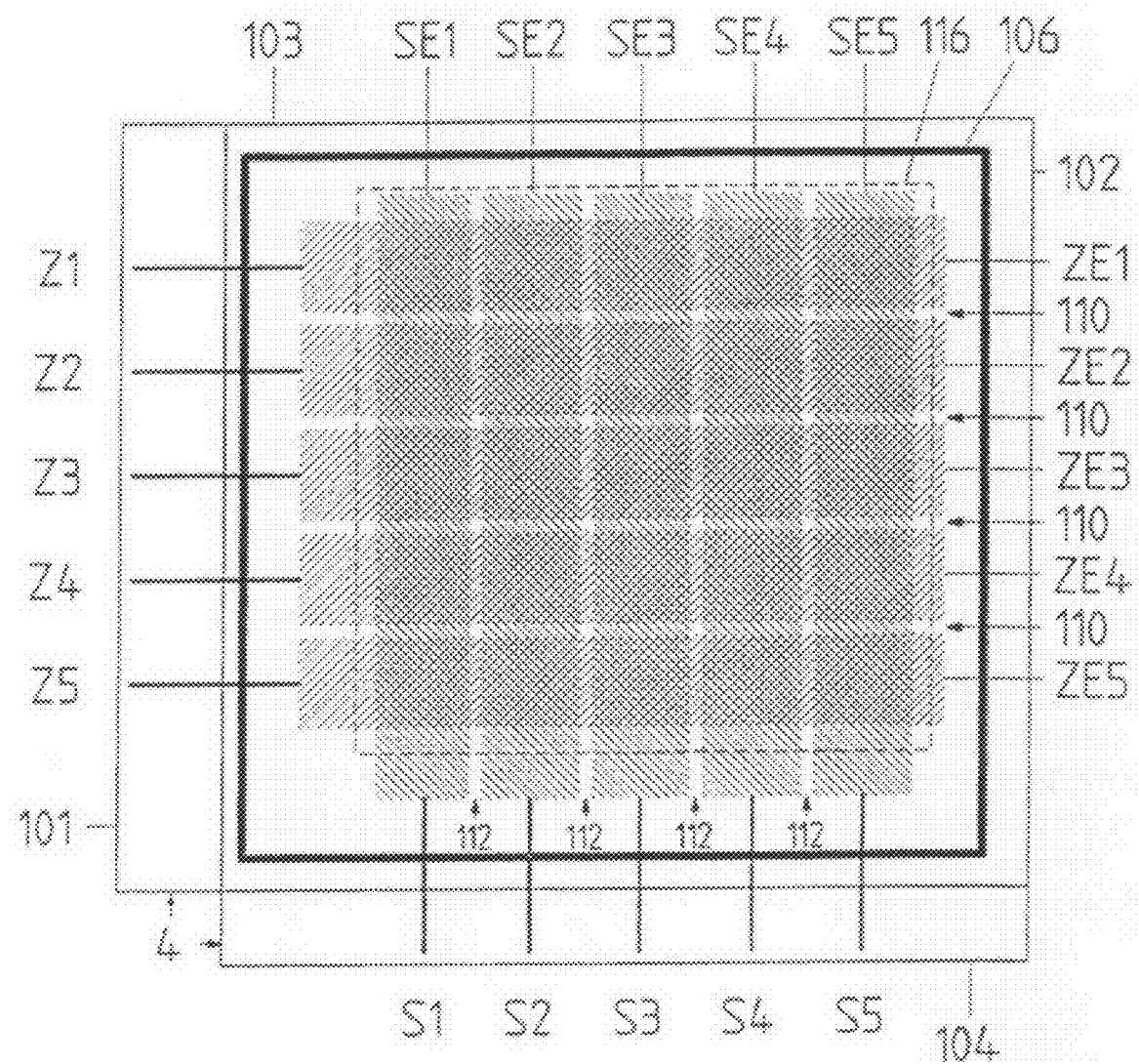
FIG. 12 is a schematic diagram of another LCD display element according to the prior art.

FIGS. 9A and 9*b* show an exemplary embodiment of a display panel that includes eight LCD display elements 42-1 through 42-8. FIG. 9A shows a plan view, and FIG. 9B shows a side view. Four LCD display elements 42-1 through 42-4 are arranged side by side in a line, flush against one another. The four other LCD display elements 42-5 through 42-8 are arranged side-by-side in a second line, rotated 1800, also flush against one another and flush against the first four LCD display elements 42-1 through 42-4. The contact margins 4 of the individual LCD display elements are each positioned at the outside, on the upper and lower edges of the display panel. The routing of the row leads Z allows the optically inactive margin in the area of the left, the upper and the right lateral edges 5, 6 and 7 to be thin and narrow enough in configuration that it is around half the width of a spacing area 20. Thus, the crossover between two LCD display elements arranged flush against one another is nearly optically imperceptible.

FIGS. 10A and 10B show an alternative embodiment of a display panel having a matrix arrangement of individual LCD display elements 42-*i* with four rows AZ and three columns AS. FIG. 10A shows a plan view, and FIG. 10B shows a side view. The LCD elements 42-*i* are arranged in a line in the manner of shingles overlapping one another in the area of the contact margin 4. The individual rows AZ are arranged flush against one another, side-by-side. In this manner, nearly any size display panel can be produced. The embodiment shown in FIG. 10 is especially suitable for use in reflective LCD display elements having a cholesteric liquid crystal.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An LCD display element, comprising:
   a first cover plate;
   a second cover plate; an adhesive rim, wherein the first cover plate is connected to the second cover plate by the adhesive rim;
   a liquid crystal disposed inside the adhesive rim and between the first cover plate and the second cover plate;
   an electrode assembly having S column electrodes and Z row electrodes, wherein the column electrodes are disposed on an interior side of the first cover plate, wherein the row electrodes are disposed on an interior side of the second cover plate, wherein individual pixel segments are located where column electrodes cross row electrodes;
   Z row leads that are disposed on the interior side of the first cover plate, wherein one of the row leads is routed between two adjacent column electrodes, wherein the one of the row leads is connected to one of the row electrodes at a contact point located in a spacing area between the two adjacent column electrodes, and wherein the contact point produces an electrical connection between a row lead and a row electrode;
   S column leads that are disposed on the interior side of the first cover plate, wherein each column lead is connected to one of the column electrodes, wherein each of the column electrodes has a first electrode end and a second electrode end, wherein each of the column leads contacts one of the column electrodes at a first electrode end, wherein the row leads and the column leads are disposed both inside and outside the adhesive rim and extend between the adhesive rim and the first cover plate; and connecting elements, wherein each of the connecting elements connects adjacent pixel segments, and wherein the connecting elements are narrower than the pixel segments.

2. The LCD display element of claim 1, wherein less than two of the row leads are routed between two adjacent column electrodes if Z is less than S.

3. The LCD display element of claim 1, wherein at least one of the row leads is routed between two adjacent column electrodes if Z is greater than or equal to S.

4. The LCD display element of claim 1, wherein the LCD display element has a straight LCD edge, and wherein the row leads and the column leads traverse the adhesive rim at the straight LCD edge.

5. The LCD display element of claim 1, wherein the pixel segments have upper edges and lower edges, and wherein the connecting elements electrically connect the pixel segments to each other alternately at the upper edges and the lower edges of the pixel segments.

6. The LCD display element of claim 1, wherein the connecting elements have a width, wherein the pixel segments have a width, and wherein the width of the connecting elements is approximately 5% of the width of the pixel segments.

7. The LCD display element of claim 1, wherein the connecting elements have a width, wherein the width of the connecting elements is approximately 0.1 mm.

8. The LCD display element of claim 1, wherein the pixel segments are rectangular with chamfered corners.

9. The LCD display element of claim 1, wherein the pixel segments are rounded.

10. The LCD display element of claim 1, wherein the electrode assembly is disposed within a viewing field, wherein separation areas exist between adjacent row electrodes, wherein adhesive points connect the first cover plate to the second cover plate, and wherein the adhesive points are located in the viewing field where the spacing areas cross the separation areas.

11. The LCD display element of claim 10, wherein the adhesive points cover the row electrodes in the vicinity of the spacing areas.

12. The LCD display element of claim 10, wherein the adhesive points are evenly distributed over the viewing field.

13. The LCD display element of claim 10, wherein the adhesive points are made of the same material as the adhesive rim.

14. The LCD display element of claim 10, wherein contact points are evenly distributed over the viewing field.

15. The LCD display element of claim 1, wherein the contact point and the adhesive rim are made of the same material, and wherein the contact point is additionally laced with conductive particles.

16. The LCD display element of claim 1, wherein a liquid crystal alignment layer is disposed between the first cover plate and the liquid crystal, wherein the liquid crystal alignment layer is made of a material, and wherein the contact point is formed on the liquid crystal alignment layer from a combination of the material of the liquid crystal alignment layer and electrically conductive particles.

17. The LCD display element of claim 16, wherein the electrically conductive particles have an average diameter that is between 10% and 20% greater than the distance between the first cover plate and the second cover plate, and wherein the electrically conductive particles are not in contact with one another in a direction that is parallel to the first cover plate and the second cover plate.

18. The LCD display element of claim 1, wherein separation areas exist between adjacent row electrodes, wherein adhesive points connect the first cover plate to the second cover plate, wherein crossover areas are located where the spacing areas cross the separation areas, and wherein the adhesive points are located at more than 50% of the crossover areas.

19. The LCD display element of claim 1, wherein the liquid crystal is a cholesteric liquid crystal (ChLCD).

20. The LCD display element of claim 1, wherein the liquid crystal is a TN or an ETN liquid crystal and has a twisted liquid crystal structure.

21. The LCD display element of claim 1, wherein the LCD display element is part of an LCD display panel that has a plurality of LCD display elements, wherein each of the plurality of LCD display elements is rectangular, wherein each of the plurality of LCD display elements has row leads and column leads that are routed through the adhesive rim on one of the four sides of each rectangular LCD display element, and wherein each of the plurality of LCD display elements is joined to another of the plurality of LCD display elements on at least one of the three other sides of each rectangular LCD display element.

22. An LCD display panel, comprising:
an adhesive rim;
a first cover plate;
a second cover plate that is connected to the first cover plate by the adhesive rim;
a liquid crystal disposed inside the adhesive rim and between the first cover plate and the second cover plate;
column electrodes that are disposed on an interior side of the first cover plate;
row electrodes that are disposed on an interior side of the second cover plate, wherein pixel segments are located where column electrodes cross row electrodes;
row leads that are disposed on the interior side of the first cover plate, wherein one of the row leads is routed between two adjacent column electrodes and is connected to one of the row electrodes at a contact point located in a spacing area between the two adjacent column electrodes, and wherein the contact point produces an electrical connection between a row lead and a row electrode;
column leads that are disposed on the interior side of the first cover plate, wherein each column lead is connected to a column electrode, wherein each of the column leads contacts a column electrode at an end of the column electrode, wherein the row leads and the column leads extend between the adhesive rim and the first cover plate; and
connecting elements, wherein each of the connecting elements connects adjacent pixel segments, and wherein the connecting elements are narrower than the pixel segments.

23. An LCD display panel, comprising:
an adhesive rim;
a first cover plate;
a second cover plate that is connected to the first cover plate by the adhesive rim;
a liquid crystal disposed inside the adhesive rim and between the first cover plate and the second cover plate;
column electrodes that are disposed on an interior side of the first cover plate;

row electrodes that are disposed on an interior side of the second cover plate, wherein pixel segments are located where column electrodes cross row electrodes;

row leads that are disposed on the interior side of the first cover plate, wherein one of the row leads is routed between two adjacent column electrodes and is connected to one of the row electrodes at a contact point located in a spacing area between the two adjacent column electrodes, and wherein the contact point produces an electrical connection between a row lead and a row electrode;

column leads that are disposed on the interior side of the first cover plate, wherein each column lead is connected to a column electrode, wherein each of the column leads contacts a column electrode at an end of the column electrode, wherein the row leads and the column leads extend between the adhesive rim and the first cover plate; and means for connecting adjacent pixel segments, wherein the means is narrower than the adjacent pixel segments.

* * * * *